United States Patent [19]

Demiryont

[11] Patent Number: 5,253,101
[45] Date of Patent: Oct. 12, 1993

[54] ELECTROCHROMIC MATERIAL AND METHOD OF MAKING AN ELECTROCHROMIC MATERIAL

[75] Inventor: Hulya Demiryont, Dearborn, Mich.

[73] Assignee: Ford Motor Company, Dearborn, Mich.

[21] Appl. No.: 267,858

[22] Filed: Nov. 7, 1988

Related U.S. Application Data

[63] Continuation-in-part of Ser. No. 138,234, Dec. 28, 1987.

[52] U.S. Cl. .................................................. 359/373
[51] Int. Cl.$^5$ .............................................. G02F 1/01
[58] Field of Search ................ 350/357; 359/273, 900

[56] References Cited

U.S. PATENT DOCUMENTS

| | | | |
|---|---|---|---|
| 4,278,329 | 7/1981 | Matsuhiro et al. | 350/357 |
| 4,306,773 | 12/1981 | Arnoldussen | 350/357 |
| 4,475,795 | 10/1984 | Leibowitz et al. | 350/357 |
| 4,585,312 | 4/1986 | Ishiwata et al. | 350/357 |
| 4,889,414 | 12/1989 | Rauh et al. | 350/357 |
| 4,960,324 | 10/1990 | Brown | 350/357 |

FOREIGN PATENT DOCUMENTS

| | | | |
|---|---|---|---|
| 2710772 | 9/1977 | Fed. Rep. of Germany | 350/357 |
| 0158834 | 9/1982 | Japan | 350/357 |
| 58-168037 | 4/1983 | Japan | |
| 0209721 | 12/1983 | Japan | 350/357 |
| 49519 | 3/1984 | Japan | 350/357 |
| 0114519 | 7/1984 | Japan | 350/357 |
| 0061726 | 4/1985 | Japan | 350/357 |
| 2204236 | 9/1987 | Japan | 350/357 |

OTHER PUBLICATIONS

Thin Solid Films, vol. 71, No. 2, Sep. 1980, pp. 221-236, Elsevier Sequoia S.A., Lausanne, CH; P. Gerard et al "Characterization of a -WO3 Thin Films Before and After Colouration".

Journal of Applied Physics, vol. 57, No. 3, Feb. 1985, pp. 911-919, American Institute of Physics, Woodbury, N.Y., US; T. Yohimura: "Oscillator Strength of Small-Polaron Absorption in $WO_x$ ($x \leq 3$) Electrochromic Thin Films".

*Primary Examiner*—Robert J. Pascal
*Assistant Examiner*—Michael B. Shingleton
*Attorney, Agent, or Firm*—Lorraine S. Melotik; Roger L. May

[57] ABSTRACT

This specification discloses reduced tungsten oxide electrochromic material, useful in an electrochromic device, having excellent electrochromic properties. The oxidation number of the tungsten of the material as deposited on a support of the device in a stable bleached condition is, on average, between +5.99 and +5.90. The material may be made by reducing fully oxidized tungsten oxide by a reducing agent. The reducing agent may be a metal or a metal oxide.

4 Claims, No Drawings

ELECTROCHROMIC MATERIAL AND METHOD OF MAKING AN ELECTROCHROMIC MATERIAL

This application is a continuation-in-part of application U.S. Ser. No. 138,234 filed Dec. 28, 1987.

BACKGROUND OF THE INVENTION

1. Field of the Invention

This invention relates to a reduced tungsten oxide electrochromic material, a method of making a reduced tungsten oxideelectrochromic material, and an electrochromic device comprising a reduced tungsten oxide electrochromic material.

2. Discussion of the Related Art

In order for reader to obtain a thorough understanding of electrochromic behavior in electrochromic materials, the reader is referred applicant's patent application entitled: "New Electrochromic Device and Method of Making an Electrochromic Layer Therefor" which was filed on Dec. 24, 1987 given U.S. Ser. No. 137,631. Since that application has a thorough discussion of electrochromic behavior in electrochromic materials, no further discussion of that subject matter will be undertaken herein.

Most simply, an electrochromic device comprises an electrochromic material layer in contact with an ion conductor material layer which is a source of ions. The electrochromic material is an insulator (dielectric material). These two layers are positioned between electrodes, at least one of which is transparent. Because the electrochromic material is a dielectric material, when a voltage is applied across the electrodes, an electric field is generated within the electrochromic material. This electric field can cause migration of the ions to the electrochromic material which produces chemical changes (electrochromic states) and corresponding color changes in the electrochromic material. The electrochromic material may change color, e.g., from colorless to blue, when it "switches" from one electrochromic state to another. By reversing the polarity of the applied voltage and hence the electric field, the electrochromic material can be switched back, e.g., from blue to colorless, that is, from its "colored" to its "bleached" state. The electrochromic material may be persistent in either its colored state or its non-colored state. By "persistent" is meant the ability of the material to remain, after removal of the electric field, in the absorptive state to which it is changed, as distinguished from a substantially instantaneous reversion to the initial state. The length of time a material is persistent is called its "open circuit memory" or simply "memory". Electrochromic devices are well known in the art and have been disclosed for example, in U.S. Pat. Nos. 3,521,941, 4,170,406, 4,194,812, 4,344,674, 4,505,538 and 4,645,308.

Literature available in this area teaches that tungsten oxide is a good electrochromic material. This electrochromic material was indicated to be fully oxidized tungsten oxide ($WO_3$). A good electrochromic material would be understood, e.g., to exhibit a high color contrast between its colored and bleached states, be capable of being switched by a low applied voltage, display a rapid rate of coloring and bleaching, and possess a long lasting open circuit memory.

The reader is referred to Volume 823 of the proceedings of The International Society For Optical Engineering entitled: "Optical Materials Technology for Energy Efficiency and Solar Energy Conversion VI." In this volume in an article entitled: "Smart Window Coatings: Some Recent Advances", the authors on page 67 thereof give an equation for electrochromic tungsten oxide as fully oxidized tungsten oxide ($WO_3$).

Thus it was believed that fully oxidized tungsten oxide ($WO_3$) was a good electrochromic material. However, applicant determined that, in fact, fully oxidized tungsten oxide is not a good electrochromic material. That is, fully oxidized tungsten oxide ($WO_3$) does not possess good electrochromic properties as defined herein. However, when applicant conducted experiments utilizing tungsten oxide in a particular oxygen deficient (i.e., reduced state), the reduced tungsten oxide was unexpectedly found to possess excellent electrochromic properties.

Applicant conducted an extensive search in the United States Patent and Trademark Office in the area of electrochromic materials and methods of making such materials. During that search, applicant did not find any prior art which was considered relevant to the subject matter disclosed and claimed herein.

It is an object of this invention to provide reduced tungsten oxide electrochromic material as a cathodic electrochromic material which has excellent electrochromic properties.

It is another object of this invention to provide a method for making such material.

SUMMARY OF THE INVENTION

This invention is directed to a reduced tungsten oxide electrochromic material useful in an electrochromic device. The oxidation number of the tungsten of the material as deposited on a support of the device in a stable bleached condition is, on average, between $+5.99$ and $+5.80$. Preferably, the oxidation number, on average, is between $+5.96$ and $+5.90$, most preferably being $+5.94$. According to another aspect of this invention, it is directed to a method which comprised providing this reduced tungsten oxide electrochromic material on a support for an electrochromic device.

According to yet another aspect of this invention, the invention is directed to a method of making such a reduced tungsten oxide electrochromic material from fully oxidized tungsten oxide ($WO_3$). According to one embodiment of this method, the fully oxidized tungsten oxide is mixed and reacted with a reducing agent in a non-oxidizing atmosphere so as to form the reduced tungsten oxide electrochromic material. The reducing agent may be a metal or a metal oxide. This material may be subsequently deposited on a support for an electrochromic device.

According to another aspect of the invention, a reduced tungsten oxide electrochromic material made by the method disclosed above is described as is an electrochromic device comprising such material.

As mentioned previously herein, fully oxidized tungsten oxide ($WO_3$, wherein the oxidation number of the tungsten is $+6$) does not possess good electrochromic properties. The tungsten oxide electrochromic material made according to this invention in its less than fully oxidized state, wherein the oxidation number of the tungsten of the material in a stable bleached condition is, on average, between $+5.99$ and $+5.80$, however, possesses excellent electrochromic properties. For example, embodiments of such electrochromic materials exhibit a high color contrast between their colored and bleached states during switching in an electrochromic device, are capable of being switched by a low applied voltage, display a rapid rate of coloring and bleaching during switching, and possess a long lasting open circuit memory.

DESCRIPTION OF THE PREFERRED EMBODIMENTS

The following description is considered to disclose the preferred embodiments of this invention. The following description also sets forth what is now contemplated to be the best mode of making the electrochromic material of this invention. The description is not intended, however, to be a limitation upon the broader principles of this invention.

As described previously herein, it has been generally reported in the literature that fully oxidized tungsten oxide is a good electrochromic material. In fact, it has been discovered by applicant that fully oxidized tungsten oxide ($WO_3$) is not a good electrochromic material. Unexpectedly, according to the invention disclosed herein, it has been found that reduced tungsten oxide electrochromic material, the tungsten of the material in its stable bleached condition having, on average, an oxidation number between $+5.99$ and $+5.90$, possesses excellent electrochromic properties. According to a method disclosed herein, a reduced tungsten oxide electrochromic material having excellent electrochromic properties may be made from fully oxidized tungsten oxide. The reduced tungsten oxide electrochromic material may subsequently be deposited on a support for the electrochromic device. By stable condition of the material is meant herein its (as deposited) bleached condition in which it exists prior to application of a negative voltage which switches it to its colored state. Upon removal of the applied voltage, the material will return to its bleached stable condition.

The reduced tungsten oxide electrochromic material may be obtained by various techniques. One technique comprises mixing and reacting fully oxidized tungsten oxide with a reducing agent in a non-oxidizing atmosphere to form the reduced tungsten oxide electrochromic material. Suitable reducing agents include both metals and metal oxides and compatible mixtures thereof. Exemplary of metals which may be mixed and reacted with the fully oxidized tungsten oxide according to this invention are tungsten, aluminum, sodium, bismuth, lead, silver, and hydrogen. The metal oxides may be selected from reducing oxide compounds of the above described metals, e.g., lead oxide and bismuth oxide. As would be apparent to one skilled in the art in view of the present disclosure, the metal oxide would generally be in a reduced form which would allow its oxidation. For example, a lead oxide reducing agent would be $PbO$ or $Pb_3O_4$ rather than $PbO_2$.

In embodiments of the invention employing a metal as the reducing agent, it is generally employed with the fully oxidized tungsten oxide in an amount no greater than about 2 percent by weight, preferably in an amount between about 1 and about 2 percent by weight, based on the total weight of the fully oxidized tungsten oxide and metal reducing agent employed. In embodiments of the invention employing a metal oxide as the reducing agent, the metal is employed with the fully oxidized tungsten oxide in an amount no greater than about 10% by weight, preferably in an amount between about 3 and about 7 percent by weight, based on the total weight of the fully oxidized tungsten oxide and metal oxide reducing agent employed. Advantageously, it is believed that by depositing a reduced tungsten oxide electrochromic material which contains reducing agent as described herein, the tungsten of the material is maintained in its desired reduced state even upon exposure to oxygen under normal conditions, e.g., ambient temperatures. Since the metal or metal oxide reducing agent as deposited on the support would not generally be in its fully oxidized state, and since such reducing agents have a greater oxygen affinity than does tungsten, they would be more susceptible to oxidation than the tungsten. Thus, codeposition of not fully oxidized reducing agents in the electrochromic material is believed to offer protection against undesirable oxidation of the deposited electrochromic material of this invention.

The electrochromic properties of the electrochromic film are, of course, controlled by the reducing agent present and the amount in which it is present. Such properties as memory, color contrast during switching, and electrochromic response time for switching depend on these parameters. The type and amount of reducing agent present also controls the degree to which the previously fully oxidized tungsten oxide is reduced which consequently affects such properties.

A reduced electrochromic material according to this invention may be deposited on the support by any suitable technique, for example, by vacuum deposition, chemical vapor deposition, thermal evaporation, sputtering, sol-gel deposition, and the like. Conditions of deposition would be so chosen that the material would be maintained in its reduced state. Selection of the optimal deposition technique and parameters will be apparent to those skilled in the art in view of the present disclosure.

Still another method useful to provide a reduced tungsten oxide electrochromic material on a support according to this invention comprises employing physical deposition methods like reactive sputtering of tungsten in an atmosphere comprising oxygen. During reactive sputtering, the tungsten "reacts" with the oxygen to form the tungsten oxide as it deposits onto a support. By controlling the ratio of oxygen to inert gas present in the sputtering chamber, the composition of the deposited film can be controlled to provide a reduced tungsten oxide electrochromic material according to this invention.

The reactive sputtering process beginning with the setting of the inert gas flow rate and adjusting the pressure within the chamber, whereafter the high voltage is turned on and the current is set. A plasma of positively charged inert gas ions is formed and ions are attracted to the negatively charged tungsten target. The reactive gas, oxygen, is then admitted to the system in a prescribed concentration relative that of the inert gas. Subsequently a shutter between the target and the support is removed and deposition is begun. The oxygen reacts with the sputtered tungsten and deposits on the support. Some reaction of tungsten and oxygen can also be expected to take place on the target surface as well as on the support surface during condensation. The average oxidation level of the tungsten of the reduced tungsten oxide deposited material is determined by the sputtering rate and the concentration of the reactive gas in the chamber. Reactive sputtering techniques are discussed in "Reactive Sputter Deposition, A Quantitative Analysis", D. K. Hohne, D. J. Schmatz and M. D. Hurley, Thin Solid Films, 118, 301–310 (1984), which article is hereby expressly incorporated by reference for such teachings.

The above discussion was directed to the use of sputtering techniques to deposit reduced tungsten oxide electrochromic material using only a tungsten target. Also according to this invention, such techniques can be used with another target in addition to the tungsten target to deposit another embodiment of a reduced tungsten oxide electrochromic material. For example, this other target may comprise a reducing agent, such as tungsten or bismuth.

While one physical deposition technique, i.e., reactive sputtering, has been discussed in detail above, such discussion is not meant to limit the deposition of the reduced tungsten oxide electrochromic material to such deposition techniques. Other deposition methods, suitable for use in this invention include ion beam sputtering of a tungsten target in an oxygen/inert gas atmosphere and ion plating using either arc or electron beam evaporation of tungsten or tungsten and a metal reducing agent in an oxygen/inert gas atmosphere.

As has been discussed hereinbefore, the composition of the reduced tungsten oxide electrochromic material will have an effect on the electrochromic properties of the material. For example, it has been found that the preferred reduced tungsten oxide made according to this invention by, e.g., reactive sputtering techniques has in a stable bleached condition is, on average, between $+5.99$ and $+5.90$, most preferably being $+5.94$.

The preferred reduced tungsten oxide materials made according to this invention exhibit a light blue to blue color when deposited (i.e., in their bleached state). This light blue/blue color is not apparently influenced by the particular reducing agent codeposited with the fully oxidized tungsten oxide but only depends on the amount of reducing agent codeposited. That is, irrespective of whether the reducing agent is e.g., Ag, Al, Bi, or W, the reduced tungsten oxide made according to this invention possesses excellent electrochromic properties and is light blue/blue in color when deposited. The most preferred reduced tungsten oxide materials made according to this invention exhibit the light blue color. In contrast, fully oxidized tungsten oxide (no codeposited reducing agent) is colorless in its s deposited state and non-electrochromic reduced tungsten oxide (over reduced tungsten oxide) is deep-blue in its as deposited state. The color of the preferred reduced tungsten oxides made according to this invention can generally be characterized by an absorption coefficient in the range of 500–7000 $cm^{-1}$ at 550 nm (wavelength).

EXAMPLE I

This example shows the difference in electrochromic properties of various tungsten oxide materials: stoichiometric tungsten oxide, reduced tungsten oxide electrochromic material (according to this invention), and metal rich tungsten oxide. A glass substrate ($6'' \times 6''$) was coated on one side with a fluorine doped tin oxide in a thickness of 180 nm. The surface resistance of the tin oxide electrode was 40 ohms/square. The optical transmittance of this tin oxide electrode was about 80%. A tungsten oxide film was deposited on the electrode surface by d.c. magnetron sputtering. Elemental tungsten was used as a target (source material). A mixture of argon and oxygen gas was used the ambient gas. During the sputtering, the gas ions bombard the target surface and sputtered particles from the target surface condense on the electrode surface located about 10 cm from the target. Typically, the pressure inside the chamber was 12 millitorrs and a current was employed which developed a power of about 550 watts. The ratio of oxygen to argon in the ambient gas was controlled so as to deposit a center circular area of stoichiometric tungsten oxide and, radiating outward from the center of the circle, gradient rings of tungsten oxide which were progressively more oxygen deficient, progressing to outermost ring portions which were pure tungsten. To produce such a pattern, the oxygen concentration was varied from 9% to about 0% by volume (respectively producing the central $WO_3$ out to the pure W). The deposition was carried out at about 50° C. and the thickness of the deposited tungsten oxide film was nearly uniform, being on average about 350 nm.

It was noted that the center circle area (2″ in diameter) consisted essentially of $WO_3$ and was colorless. Moving radially outward, the rings went from light blue to dark blue in the outermost rings.

The glass/electrode/tungsten oxide system made above was assembled into a conventional electrochromic device of the type herein previously described. That is another glass/electrode system was assembled parallel to the glass/electrode/tungsten oxide system using a 1 molar solution of lithium perchloride in propylene carbonate as the electrolyte therebetween. A $-2$ volts was applied across the electrodes, the negative polarity applied to the electrode (i.e., the cathode) in contact with the deposited tungsten oxide. The light blue regions are the first to become colored. They color to a deep blue. Subsequently, the regions radially outward and inward of the light blue regions color to a medium blue. The deep blue (as deposited) colored outermost rings do not change in color, remaining deep blue.

Then the polarity of the applied voltage is reversed. Reversing the polarity of the applied voltage in this manner is done to initiate bleaching of the tungsten oxide film. The as deposited light blue region was the first region to bleach to its as deposited color followed by the blue region. Then the $WO_3$ region bleached to its initial colorless state. The dark blue as deposited region did not bleach but remained in it$as as deposited dark blue color. The system was again colored and then disconnected from the voltage source. The $WO_3$ region bleached on its own within two weeks. The as deposited light blue region maintained its dark blue color for about 6 weeks.

The composition of the tungsten oxide was determined by an effective medium model from optical data. Such techniques are described in SPIE, International Society for Optical Engineering, Volume 652, *Thin Film Technologies II*. 1986, p. 184. The composition of these colored rings having the excellent electrochromic properties varied, being characterized by the formula: $WO_x$, where x varied from less than 3 to about 2.90 (corresponding to W having an oxidation number between $+5.99$ and $+5.8$). The more preferred material was characterized by the formula: $WO_x$, where x varied between 2.98 to 2.95 (corresponding to W having oxidation numbers between $+5.96$ to $+5.90$). The reduced tungsten oxide electrochromic material having the best electrochromic properties was: $WO_{2.97}$ (corresponding to W having an oxidation number of $+5.94$). Below about $WO_{2.90}$ (oxidation of W being 5.80), the material did not have electrochromic properties.

From this example it can be seen that the reduced tungsten oxide electrochromic material made according to this invention exhibited faster response time, better color contrast in the colored and bleached states, and maintained its colored state longer as compared to stoichiometric tungsten oxide.

EXAMPLE 2

According to this example a reduced tungsten oxide electrochromic material was made according to this invention using thermal evaporation techniques. A mixture of fully oxidized tungsten oxide powder and 1% by weight tungsten powder (based on the total weight of the powders) were premixed with one another and placed in a tantalum boat. The tantalum boat was heated in a suitable vacuum chamber. A predeposition process consisted of heating the tantalum boat to a temperature just below the evaporation temperature thereof for about 30 minutes at $10^{-5}$ torr vacuum. A transparent electrode was positioned about 10 cm from the tantalum boat. The temperature of the tantalum boat was raised and a flash evaporation carried out to deposit an electrochromic film on the transparent electrode. The electrochromic film was built up at a rate of about 200 Å per minute to a total thickness of about 4,500 Å. The film was light blue in color. An electrochromic device was completed by utilizing another transparent electrode and a source of fast ions. In its colored state, the sample exhibited approximately zero visible and IR transmittance and had a long color memory. It also exhibited fast response time (switching from a light blue to a very dark blue) and operated well at a low voltage or about 1.5 volts.

EXAMPLE 3

This example teaches that a reduced tungsten oxide electrochromic material can be made according to this invention using a metal oxide as the reducing agent. An electrochromic film was deposited on a suitable transparent electrode by a thermal evaporation process similar to that of Example 2. In this example, however, the material mixed and contained in the tantalum boat was a powdered mixture of fully oxidized tungsten oxide and lead oxide ($Pb_3O_4$) reducing agent (10% by weight of the powders being red lead oxide powder). The same preheating process was applied. A transparent electrode was positioned about 10 cm from the tantalum boat. The temperature of the tantalum boat was raised and a flash evaporation carried out to deposit an electrochromic film on the transparent electrode. The electrochromic film was built up at a rate of about 200 Å per minute to a total thickness of about 4,500 Å. An electrochromic device was completed by utilizing another transparent electrode and a source of fast ions. The sample exhibited an optical switching from a light blue to a very dark blue and displayed excellent electrochromic properties.

EXAMPLE 4

The procedure of Example 3 was repeated, except that the powder mixture in the tantalum boat contained about 5% by weight of the lead oxide reducing agent (of the total weight of the powder mixture). In this case, when an electrochromic device was constructed with this electrochromic material, it switched from a light blue color to a dark blue color.

EXAMPLE 5

An electrochromic film was deposited on a transparent electrode by thermal evaporation in a manner similar to that described in Example 3. In this situation, however, the material mixed and contained in the tantalum boat was a mixture of fully oxidized tungsten and a bismuth oxide reducing agent (10% by weight of the total). The same preheating process was applied. The source to substrate distance was 10 cm and the evaporation rate was about 200 Å per minute. The electrochromic film was deposited to a thickness of about 4,500 Å. The deposited film was then formed into an electrochromic device by utilization of a second transparent electrode and a suitable fast ion conductor material. When bismuth oxide was used as the reducing agent at this level, the electrochromic device switched from a light blue color to a very dark blue color and displayed excellent electrochromic properties. This reducing agent is effective to reduce the fully oxidized tungsten oxide to a less than fully oxidized state in which the reduced tungsten oxide is electrochromic.

EXAMPLE 6

The procedure of Example 5 was repeated in detail, except that the amount of reducing agent employed was about 5% by weight of the powder mixture. In this case, when a switching voltage of plus or minus two volts was applied the device switched from an uncolored state to a dark blue color.

EXAMPLE 7

This example illustrates that a fully oxidized tungsten oxide material is a poor electrochromic material. The reduced tungsten oxide electrochromic material deposited according to Example 6 is exposed to an oxygen atmosphere and heated for 2 hours at about 200° C. A device is assembled as in Example 6 using the oxidized tungsten oxide material The device exhibits poor color contrast and slow coloring and bleaching.

While particular embodiments of the invention have been illustrated and described, it will be obvious to those skilled in the art that various changes and modifications may be made without departing from the invention. It is intended to cover in the appended claims all such modifications and equivalents as fall within the true spirit and scope of this invention.

I claim:

1. A method which comprises depositing amorphous reduced tungsten oxide electrochromic material on a support of an electrochromic device, the oxidation number of the tungsten of the material as deposited on said support in a stable bleached condition being on average, less than $+5.99$ and greater than $+5.90$, wherein said reduced tungsten oxide electrochromic material is made by reacting fully oxidized tungsten oxide with a reducing agent in a non-oxidizing atmosphere, said reducing agent being a metal oxide used in an amount less than about 10% by weight based on the total weight of said fully oxidized tungsten oxide and said reducing agent.

2. The method of Claim 1, wherein said reduced tungsten oxide electrochromic material has said oxidation number, on average, less than or equal to $+5.96$ and greater than $+5.90$.

3. The method of Claim 2, wherein said reduced tungsten oxide electrochromic material has said oxidation number, on average, of $+5.94$.

4. The method of Claim 1, wherein said metal oxide reducing agent is selected from lead oxide and bismuth oxide.

* * * * *